United States Patent
Imanishi et al.

(10) Patent No.: US 11,513,680 B2
(45) Date of Patent: Nov. 29, 2022

(54) INFORMATION PROCESSING APPARATUS AND CONTROL METHOD

(71) Applicant: Lenovo (Singapore) Pte. Ltd., Singapore (SG)

(72) Inventors: Yoshimitsu Imanishi, Kyoto (JP); Seiichi Kawano, Kanagawa (JP); Kazunori Yamamura, Kanagawa (JP); Yoshitsugu Suzuki, Kanagawa (JP); Mitsuhiro Yamazaki, Kanagawa (JP); Ryohta Nomura, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/490,090

(22) Filed: Sep. 30, 2021

(65) Prior Publication Data

US 2022/0113865 A1 Apr. 14, 2022

(30) Foreign Application Priority Data

Oct. 9, 2020 (JP) .............................. JP2020-171183

(51) Int. Cl.
*G06F 3/041* (2006.01)
*G06F 3/04886* (2022.01)
*G06F 3/14* (2006.01)

(52) U.S. Cl.
CPC ........ *G06F 3/04886* (2013.01); *G06F 3/0416* (2013.01); *G06F 3/14* (2013.01)

(58) Field of Classification Search
CPC ...... G06F 3/04886; G06F 3/0416; G06F 3/14; G06F 3/0488; G06F 3/1423;

(Continued)

(56) References Cited

U.S. PATENT DOCUMENTS 8,176,324 B1 * 5/2012 Krishnamurthy ...... G06Q 20/10
713/168
2004/0021681 A1 * 2/2004 Liao .................... G06F 3/04886
715/702

(Continued)

FOREIGN PATENT DOCUMENTS

JP 2014-515515 A 6/2014
JP 2015-233198 A 12/2015

(Continued)

OTHER PUBLICATIONS

Extended European Search Report issued in corresponding European Application No. 21196555.3 dated Mar. 17, 2022 (8 pages).

*Primary Examiner* — Ryan A Lubit
(74) *Attorney, Agent, or Firm* — Osha Bergman Watanabe & Burton LLP (57) ABSTRACT

An information processing apparatus includes a display unit, a touch sensor disposed on the display unit and detects contact with an object on the display unit, a main system, and an embedded system. The embedded system generates image data of an input area for a virtual input device, output image data of the input area to the main system by using a first general-purpose interface protected by the main system, and output input information, which is based on detection information detected in the input area by the touch sensor, via the virtual input device to the main system by using a second general-purpose interface protected by the main system. The main system displays, on the display unit, the image data of the input area output by the embedded system.

7 Claims, 7 Drawing Sheets

(58) Field of Classification Search
CPC ........ G06F 3/1454; G06F 3/048; G06F 3/011; G06F 1/1616; G09G 3/035; G09G 2354/00; G09G 2358/00; G02B 27/017
See application file for complete search history.

(56) References Cited

U.S. PATENT DOCUMENTS

| | | | |
|---|---|---|---|
| 2007/0055799 A1* | 3/2007 | Koehler | G16H 40/63 710/62 |
| 2012/0311314 A1* | 12/2012 | Cumming | G06F 21/575 713/2 |
| 2017/0255320 A1 | 9/2017 | Kumar et al. | |

FOREIGN PATENT DOCUMENTS

| JP | 2018-195044 A | 12/2018 |
|---|---|---|
| JP | 2019-145058 A | 8/2019 |

* cited by examiner

FIG. 7

INFORMATION PROCESSING APPARATUS AND CONTROL METHOD

CROSS-REFERENCE TO RELATED APPLICATIONS

This application claims priority to Japanese Patent Application No. 2020-171183 filed on Oct. 9, 2020, the entire content of which is incorporated herein by reference.

TECHNICAL FIELD

The present disclosure relates to an information processing apparatus and a control method.

BACKGROUND

In recent years, there have been known information processing apparatuses such as laptop personal computers (hereinafter referred to as laptop PCs (Personal Computers)) that use display screens as virtual input devices such as software keyboards. Further, there has been proposed an information processing apparatus capable of providing a multiple display environment, in which a plurality of display units can be used by the single information processing apparatus.

Meanwhile, in general, when a virtual input device is implemented by software, there are concerns about security and privacy risks such as reading inputs to the virtual input device in an unauthorized manner from other software. For this reason, when implementing a virtual input device by software, the virtual input device is implemented as a tool that comes with an OS (Operating System) such as Windows (registered trademark), and third parties are not allowed to implement their own virtual input devices in most cases.

SUMMARY

According to one or more embodiments, an information processing apparatus includes a display unit, a touch sensor disposed on the display unit and configured to detect contact with an object on the display unit, a main system, and an embedded system. The embedded system is configured to generate image data of an input area for a virtual input device, output image data of the input area to the main system by using a first general-purpose interface protected by the main system, and output input information, which is based on detection information detected in the input area by the touch sensor, via the virtual input device to the main system by using a second general-purpose interface protected by the main system. The main system is configured to display, on the display unit, the image data of the input area output by the embedded system.

DETAILED DESCRIPTION

The following will describe an information processing apparatus according to one or more embodiments and a control method of the present disclosure with reference to the accompanying drawings.

First Embodiment

Figure 1:
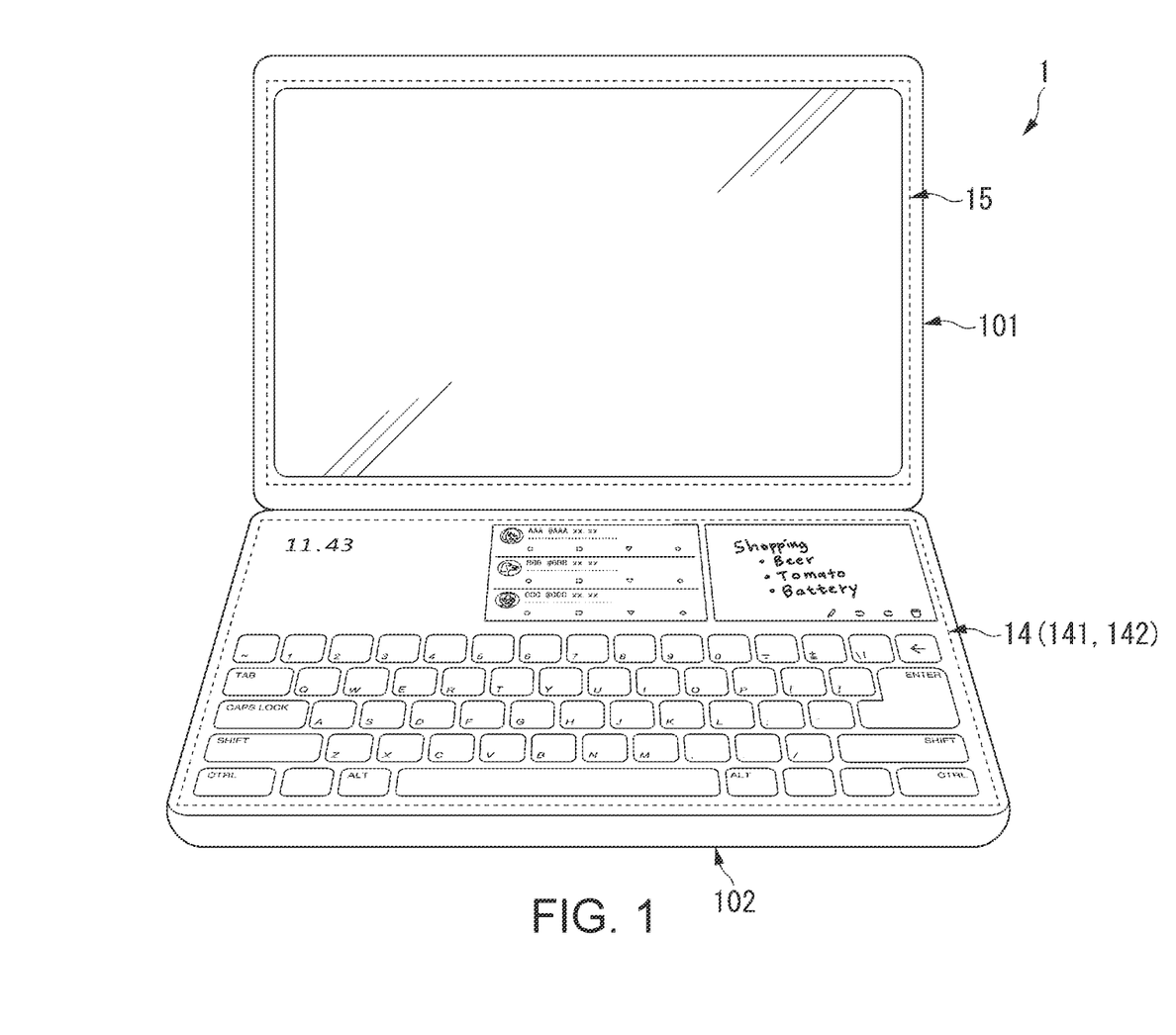
FIG. 1 is an external view illustrating an example of a laptop PC.

FIG. 1 is an external view illustrating an example of a laptop PC 1 according to a first embodiment. In the present embodiment, a description will be given of the laptop PC 1 as an example of an information processing apparatus.

As illustrated in FIG. 1, the laptop PC 1 has a first chassis 101 and a second chassis 102, and is configured such that a side surface of one chassis (the first chassis 101) is engaged with a side surface of the other chassis (the second chassis 102) by a hinge mechanism, and the first chassis 101 can be rotated with respect to the second chassis 102 around the rotation axis of the hinge mechanism.

Further, the laptop PC 1 has a touch screen 14 and a display unit 15. The display unit 15 is placed on the first chassis 101 and functions as a main display unit. The touch screen 14 is placed on the second chassis 102, and includes a display section 141 and a touch sensor section 142.

In the present embodiment, a description will be given of an example in which an OSK (On Screen Keyboard), which is a virtual input device, is implemented by the touch screen 14 placed on the second chassis 102.

Figure 2:
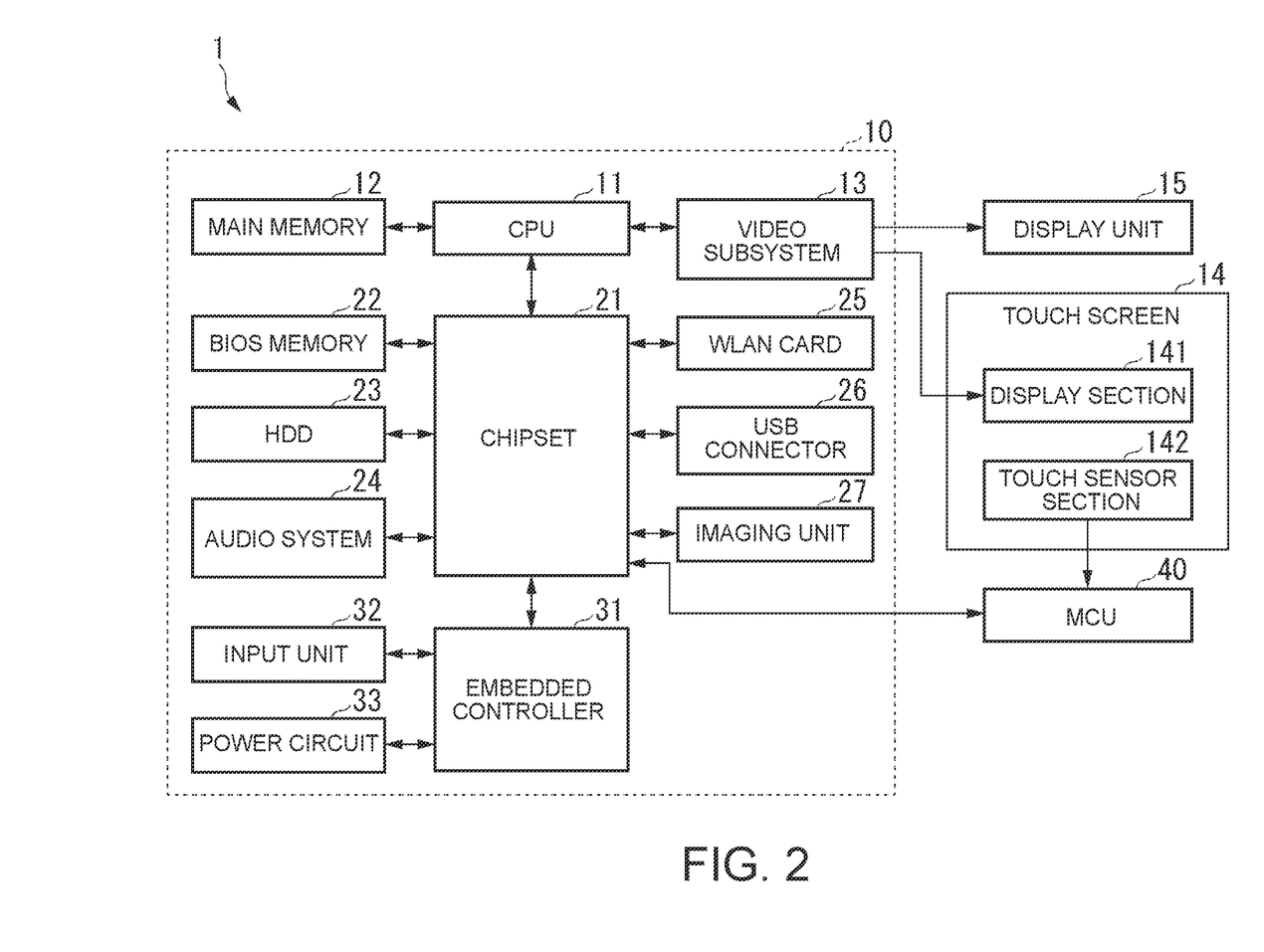
FIG. 2 is a diagram illustrating an example of a major hardware configuration of the laptop PC.

FIG. 2 is a diagram illustrating an example of the major hardware configuration of the laptop PC 1 according to the present embodiment.

As illustrated in FIG. 2, the laptop PC 1 includes a CPU 11, a main memory 12, a video subsystem 13, the touch screen 14, the display unit 15, a chipset 21, a BIOS memory 22, a HDD 23, an audio system 24, a WLAN card 25, a USB connector 26, an imaging unit 27, an embedded controller 31, an input unit 32, a power circuit 33, and a MCU (Micro Control Unit) 40.

In the present embodiment, the CPU 11, the main memory 12, the video subsystem 13, the chipset 21, the BIOS memory 22, the HDD 23, the audio system 24, the WLAN card 25, the USB connector 26, the imaging unit 27, the embedded controller 31, the input unit 32, and the power circuit 33 correspond to a main system 10 that performs the processing based on an OS (Operating System).

The main system 10 executes various types of processing on the basis of, for example, Windows (registered trademark).

The CPU (Central Processing Unit) 11 executes various types of arithmetic processing under program control to control the entire laptop PC 1.

The main memory 12 is a writable memory that is used as an area for reading an executable program of the CPU 11 or as a work area for writing processing data of an executable program. The main memory 12 is composed of, for example, a plurality of DRAM (Dynamic Random Access Memory) chips. The executable program includes an OS, various drivers for hardware operation of peripheral devices, various services/utilities, application programs, and the like.

The video subsystem 13 is a subsystem for implementing functions related to image display and includes a video controller. This video controller processes drawing instructions from the CPU 11, writes the processed drawing information to a video memory, reads the drawing information from the video memory, and outputs the read drawing information as drawing data (image data) to the display unit 15 and a display section 141. The video subsystem 13 outputs, for example, via HDMI (High-Definition Multimedia Interface (registered trademark)) or DP (Display Port).

The touch screen 14 is placed on the second chassis 102 and includes the display section 141 and the touch sensor section 142, as illustrated in FIG. 1

The display section 141 is, for example, a liquid crystal display or an e-paper, and displays image data on the display screen thereof.

The touch sensor section 142 is placed, being superimposed on the display screen of the display section 141, and detects contact with an object (including a part of a human body) on the display screen of the display section 141. The touch sensor section 142 outputs contact position information indicating a contact position, which is the position of contact within a detection area on the display screen, to the MCU 40. In the present embodiment, the touch sensor section 142 includes a touch sensor and accompanying processing circuitry for performing the functions described herein.

The display unit 15 is placed on the first chassis 101, and functions as the main display unit of the laptop PC 1. The display unit 15 is, for example, a liquid crystal display or an organic EL display, and displays image data on the display screen.

The chipset 21 includes controllers such as USB (Universal Serial Bus), serial ATA (AT Attachment), SPI (Serial Peripheral Interface) bus, PCI (Peripheral Component Interconnect) bus, PCI-Express bus, and LPC (Low Pin Count) bus, and a plurality of devices are connected thereto. In FIG. 2, as examples of the devices, the BIOS memory 22, the HDD 23, the audio system 24, the WLAN card 25, the USB connector 26, and the imaging unit 27 are connected to the chipset 21.

The BIOS (Basic Input/Output System) memory 22 is composed of, for example, an electrically rewritable non-volatile memory such as an EEPROM (Electrically Erasable Programmable Read Only Memory) or a flash ROM. The BIOS memory 22 stores a BIOS, system firmware for controlling the embedded controller 31, and the like.

The HDD (Hard Disk Drive) 23 (an example of a non-volatile storage device) stores an OS, various drivers, various services/utilities, application programs, and various types of data.

The audio system 24 records, reproduces, and outputs sound data.

The WLAN (Wireless Local Area Network) card 25 is connected to a network by a wireless LAN to perform data communication. Upon receipt of data from the network, for example, the WLAN card 25 generates an event trigger indicating the receipt of data.

The USB connector 26 is a connector for connecting a peripheral device or the like using the USB.

The imaging unit 27 is, for example, a web camera, and captures images. The imaging unit 27 is connected with the chipset 21 through, for example, a USB interface.

The embedded controller 31 is a one-chip microcomputer that monitors and controls various devices (peripheral devices, sensors, and the like) regardless of the system state of the laptop PC 1. Further, the embedded controller 31 has a power supply management function for controlling the power circuit 33. The embedded controller 31 is composed of a CPU, a ROM, a RAM and the like (not illustrated), and also includes multiple channel A/D input terminals, D/A output terminals, timers, and digital input/output terminals. Connected to the embedded controller 31 through the input/output terminals are, for example, the input unit 32, the power circuit 33, and the like, and the embedded controller 31 controls the operations thereof.

The input unit 32 is, for example, a control switch such as a power switch.

The power circuit 33 includes, for example, a DC/DC converter, a charge/discharge unit, a battery unit, an AC/DC adapter, and the like, and converts a DC voltage supplied from the AC/DC adapter or the battery unit into a plurality of voltages required to operate the laptop PC 1. Further, the power circuit 33 supplies power to each part of the laptop PC 1 according to the control by the embedded controller 31.

The MCU 40 is, for example, a main processor including a CPU and the like, and functions as an independent embedded system different from the main system 10 by executing built-in firmware. The MCU 40 is connected to the chipset 21 by, for example, a USB interface. The MCU 40 generates image data of an input area for a virtual input device, and outputs the image data of the input area to the main system 10 by using a general-purpose interface (e.g., UVC (USB Video Class)) protected by the main system 10.

Further, the MCU 40 outputs input information based on the detection information detected by the touch sensor section 142 in the input area as the input information accepted by the virtual input device to the main system 10 (the chipset 21) by using the general-purpose interface protected by the main system 10 (e.g., a HID (Human Interface Device) class of USB). The details of the MCU 40 will be described later with reference to FIG. 3.

Figure 3:
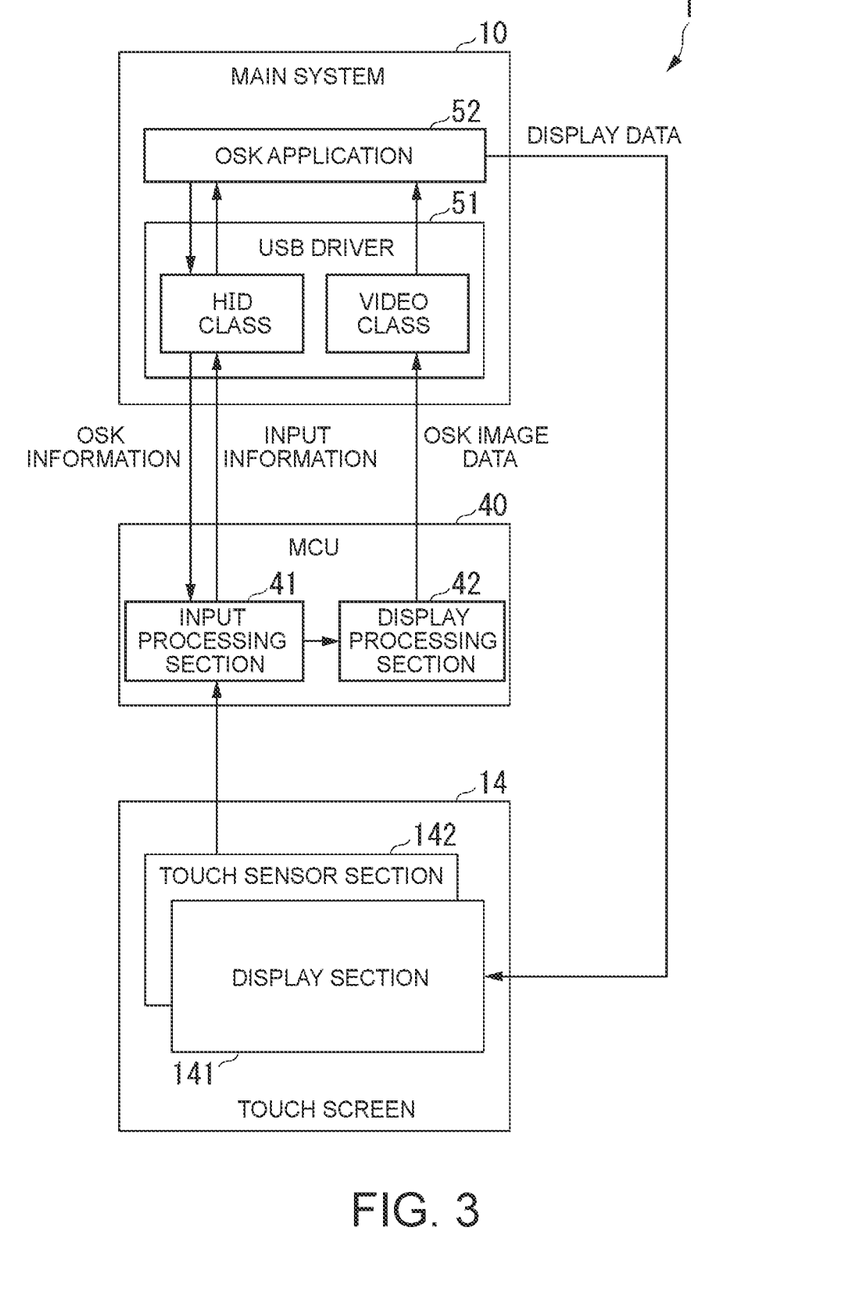
FIG. 3 is a block diagram illustrating an example of the functional configuration of the laptop PC.

Referring now to FIG. 3, the functional configuration of the laptop PC 1 according to the present embodiment will be described.

FIG. 3 is a block diagram illustrating an example of the functional configuration of the laptop PC 1 according to the present embodiment.

As illustrated in FIG. 3, the laptop PC 1 includes the main system 10, the touch screen 14, and the MCU 40. FIG. 3 illustrates only the major functional configuration of the present embodiment as the configuration of the laptop PC 1.

The main system 10 includes a USB driver 51 and an OSK application 52.

The USB driver 51 is a function section implemented by the CPU 11 and the chipset 21, and controls a USB interface. In the present embodiment, a HID class and a VIDEO class (UVC) are used as the USB interfaces.

The OSK application 52 is, for example, an API (Application Programming Interface) for using an OSK. When an OSK is used, the OSK application 52 first uses the HID class of the USB driver 51 to send OSK information, which is OSK setting information, to the MCU 40. Here, the OSK information includes, for example, type information indicating the type of a virtual input device, and display position information indicating the display position of an input area in the display section 141.

The OSK application 52 receives image data of the OSK (hereinafter referred to as "the OSK image data") output from the MCU 40 by using the VIDEO class of the USB driver 51, and causes the OSK image data to be displayed at the display position of the input area in the display section 141 mentioned above. For example, if the input area of the OSK is a part of the display section 141, then the OSK image data is overlaid on a part of the image data displayed on the display section 141 so as to generate display data, and the display data is output to the display section 141.

Further, the OSK application 52 uses the HID class of the USB driver 51 to receive input information such as a key code of the OSK from the MCU 40.

When the OSK is operated, the OSK application 52 receives, from the MCU 40, feedback OSK image data based on the operation of the OSK by using the VIDEO class of the USB driver 51, and causes the feedback OSK image data to be displayed at the display section 141. Further, if the OSK image data has been compressed, then the OSK application 52 decompresses the compressed OSK image data and outputs the decompressed OSK image data to the display section 141.

The MCU 40 includes an input processing section 41 and a display processing section 42.

The input processing section 41 uses the HID class of the USB interface to receive the type information and the display position information from the main system 10, and sets the type of the input area of a virtual input device according to the type information and sets the input area of the virtual input device according to the display position information. The input processing section 41 stores the type of the input area and the setting information of the input area in a storage (not illustrated). The type information includes, for example, an OSK, a touchpad, a handwriting input device, and the like. The input processing section 41 outputs the received type information and display position information to the display processing section 42 to generate OSK image data.

Further, the input processing section 41 acquires detection information detected by the touch sensor section 142, and converts the detection information detected in the input area set as described above into input information such as a key code. The input processing section 41 uses the HID class of the USB interface to output the converted input information to the main system 10.

Further, the input processing section 41 outputs the detection information of the touch sensor section 142 to the display processing section 42 to generate the feedback OSK image data according to the detection information.

The display processing section 42 generates the OSK image data on the basis of the type information and the display position information, and outputs the generated OSK image data to the main system 10 by using the VIDEO class (UVC) of the USB interface. The display processing section 42 may compress the generated OSK image data in a compression format such as JPEG (Joint Photographic Experts Group) and output the compressed OSK image data to the main system 10.

The operation of the laptop PC 1 according to the present embodiment will now be described with reference to the accompanying drawings.

Figure 4:
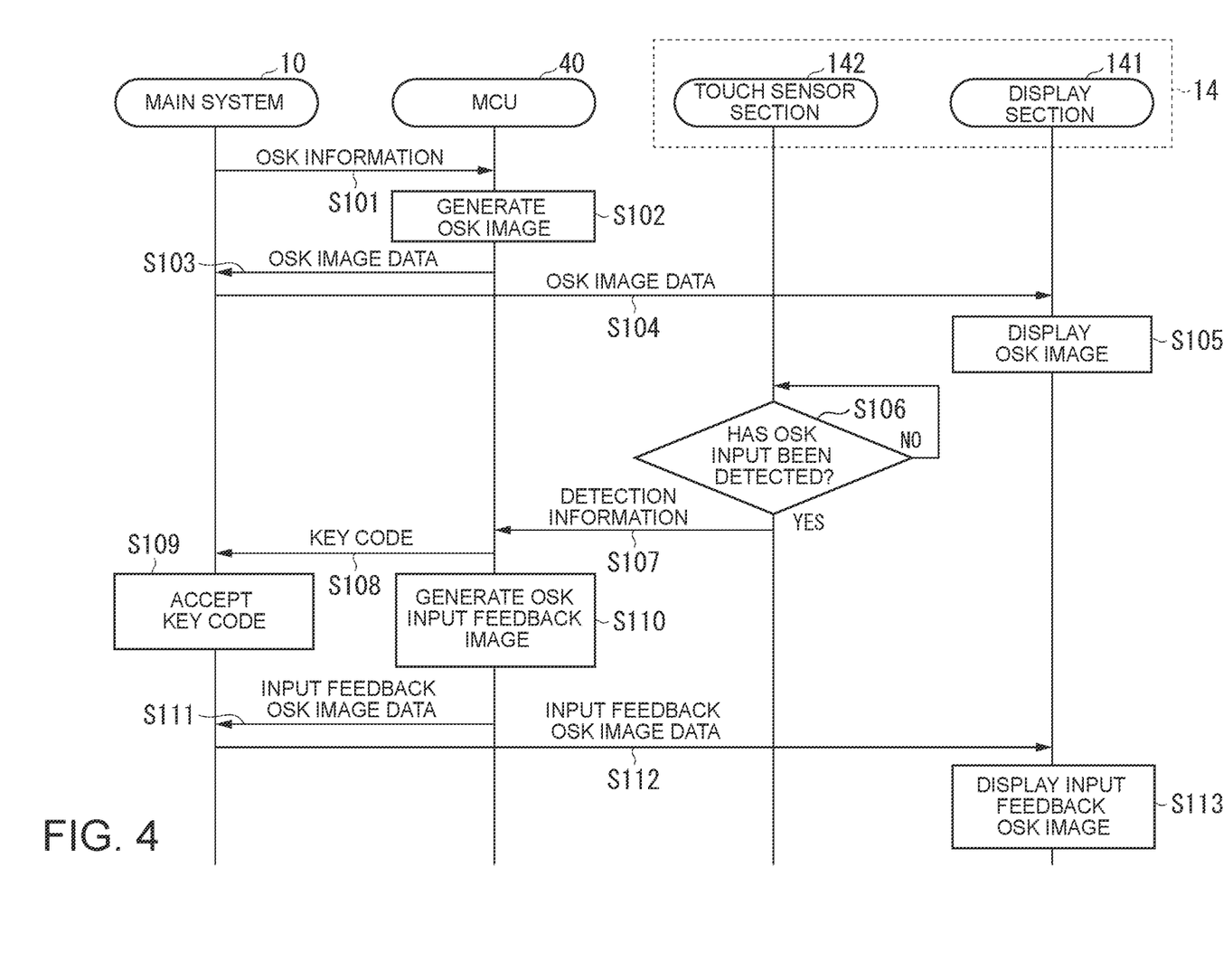
FIG. 4 is a diagram illustrating an example of the operation of a virtual input device of the laptop PC.

FIG. 4 is a diagram illustrating an example of the operation of the virtual input device of the laptop PC 1 according to the present embodiment. Here, a description will be given of an example in which the virtual input device is an OSK.

As illustrated in FIG. 4, the main system 10 of the laptop PC 1 first outputs OSK information to the MCU 40 (step S101). The OSK application 52 of the main system 10 sends OSK information that includes, for example, type information and display position information, to the MCU 40 by using the HID class of the USB driver 51.

Subsequently, the MCU 40 generates an OSK image (step S102). More specifically, the display processing section 42 of the MCU 40 generates, for example, OSK image data as displayed on the display section 141 of FIG. 1 according to the type information and the display position information. The input processing section 41 of the MCU 40 sets the input area and the type of the virtual input device according to the received type information and display position information.

Subsequently, the display processing section 42 of the MCU 40 outputs the generated OSK image data to the main system 10 by using the VIDEO class (UVC) of the USB interface (step S103). The display processing section 42 may compress the OSK image data by JPEG or the like and output the compressed OSK image data to the main system 10.

Subsequently, the OSK application 52 of the main system 10 outputs the OSK image data received from the MCU 40 to the display section 141 (step S104). If the OSK image data has been compressed, the OSK application 52 decompresses the OSK image data. Further, the OSK application 52 outputs the OSK image data to the display section 141 by an interface such as HDMI (registered trademark) to cause the OSK image data to be displayed on the display section 141 such that the set input area and the OSK image data match in the touch sensor section 142.

Subsequently, the display section 141 displays the received OSK image data (step S105). The display section 141 displays the OSK image data such that the OSK image data matches the input area of the OSK set in the touch sensor section 142.

In the meantime, the touch sensor section 142 determines whether the input of the OSK has been detected (step S106). If the input of the OSK is detected (YES in step S106), then the touch sensor section 142 proceeds with the processing to step S107. If the input of the OSK is not detected (NO in step S106), then the touch sensor section 142 returns the processing to step S106.

In step S107, the touch sensor section 142 sends the detection information, which indicates that the input of the OSK has been detected, to the MCU 40.

Subsequently, the input processing section 41 of the MCU 40 converts the detection information, which indicates that the input of the OSK has been detected, into a key code, and sends the converted key code to the main system 10 by using the HID class of the USB interface (step S108).

Subsequently, the OSK application 52 of the main system 10 accepts the received key code as an OSK input (step S109). The OSK application 52 uses the received key code as an input of various types of processing.

Further, the display processing section 42 of the MCU 40 generates an OSK input feedback image (step S110). The display processing section 42 generates an input feedback OSK image data in which, for example, the position of an OSK image corresponding to the position of a pressed key of the OSK is reversed.

Subsequently, the display processing section 42 of the MCU 40 outputs the generated input feedback OSK image data to the main system 10 by using the VIDEO class (UVC) of the USB interface (step S111).

Subsequently, the OSK application 52 of the main system 10 outputs the input feedback OSK image data received from the MCU 40 to the display section 141 (step S112).

Subsequently, the display section 141 displays the input feedback OSK image (step S113). The display section 141 displays a feedback image, in which, for example, the part of a pressed key of the OSK is reversed, according to the received input feedback OSK image data.

In the processing illustrated in FIG. 4, the processing from step S102 to step S105 may be repeatedly carried out at predetermined time intervals.

As described above, the laptop PC 1 (information processing apparatus) according to the present embodiment includes the display section 141, the touch sensor section 142, the main system 10, and the MCU 40. The touch sensor section 142 is placed on the display section 141, and detects the contact with an object on the display section 141. The main system 10 performs processing based on an OS (e.g., Windows (registered trademark). The MCU 40 (embedded system) is an independent embedded system different from the main system 10, and generates image data of an input area for a virtual input device and outputs the image data of the input area to the main system 10 by using a general-purpose interface protected by the main system 10. Further, the MCU 40 outputs, as the input information accepted by the virtual input device, the input information based on the detection information detected in the input area by the touch sensor section 142 to the main system 10 by using the general-purpose interface protected by the main system 10. Then, the main system 10 displays, on the display section 141, the image data of the input area output from the MCU 40.

Consequently, the laptop PC 1 according to the present embodiment achieves a virtual input device such as an OSK by the processing in the independent MCU 40, thus making it possible to achieve a virtual input device that provides a high degree of freedom without being restricted by the OS (e.g., Windows (registered trademark)) of the main system 10. In addition, since the laptop PC 1 according to the present embodiment outputs input information and image data of the input area to the main system 10 by using a general-purpose interface protected by the main system 10, concerns about interference from other software can be reduced. In other words, in the laptop PC 1 according to the present embodiment, even if, for example, the OS of the main system 10 is infected with a computer virus, malware, or the like, there is no risk that inputs to the virtual input device will be read. Thus, the laptop PC 1 according to the present embodiment can achieve a virtual input device that provides a high degree of freedom while protecting privacy at the same time.

Further, the laptop PC 1 according to the present embodiment can achieve a virtual input device simply by adding the MCU 40, which is an independent embedded system, so that a virtual input device with safety and a high degree of freedom can be achieved by adding a simple configuration.

Further, in the present embodiment, the MCU 40 outputs input information accepted by a virtual input device to the main system 10 by using the HID class of the USB interface, and outputs image data of an input area to the main system 10 by using the UVC.

The HID class of the USB interface and the UVC are both safe interfaces protected by an OS (e.g., Windows (registered trademark)), thus enabling the laptop PC 1 according to the present embodiment to protect privacy by a simple method.

Further, according to the present embodiment, the main system 10 sends the display position information indicating the display position of an input area in the display section 141 to the MCU 40, and displays the image data of the input area output from the MCU 40 at the display position of the input area in the display section 141. The MCU 40 sets the input area according to the display position information sent from the main system 10.

Thus, the laptop PC 1 according to the present embodiment can properly create a virtual input device at any area of the display section 141.

Further, according to the present embodiment, the main system 10 sends the type information indicating the type of a virtual input device to the MCU 40. The MCU 40 sets the type of an input area according to the type information sent from the main system 10.

Thus, the laptop PC 1 according to the present embodiment can properly support various types of virtual input devices.

Further, according to the present embodiment, the MCU 40 changes the image data of an input area according to the feedback based on input information accepted by a virtual input device.

Thus, the laptop PC 1 according to the present embodiment can achieve the display of feedback image based on input information of a virtual input device while protecting confidentiality and privacy at the same time.

Further, a control method according to the present embodiment is a control method of the laptop PC 1 provided with the display section 141, the touch sensor section 142, which is placed on the display section 141 and detects contact with an object on the display section 141, the main system 10 which performs processing based on an OS (Operating System), and the independent MCU 40 different from the main system 10, and the control method includes a first output step, a display step, and a second output step. In the first output step, the MCU 40 generates image data of an input area for a virtual input device, and outputs the image data of the input area to the main system 10 by using a general-purpose interface protected by the main system 10. In the display step, the main system 10 displays the image data of the input area output by the MCU 40 on the display section 141. In the second output step, the MCU 40 outputs, as input information accepted by a virtual input device, input information based on detection information detected in an input area by the touch sensor section 142 to the main system 10 by using the general-purpose interface protected by the main system 10.

Consequently, the control method according to the present embodiment can achieve a virtual input device which provides the same advantages as those of the above-described laptop PC 1 and has a high degree of freedom while protecting confidentiality and privacy at the same time.

In the present embodiment described above, the example in which one OSK is implemented on the touch screen 14 has been described. Alternatively, however, a plurality of virtual input devices may be implemented on the touch screen 14, as illustrated in FIG. 5.

Figure 5:
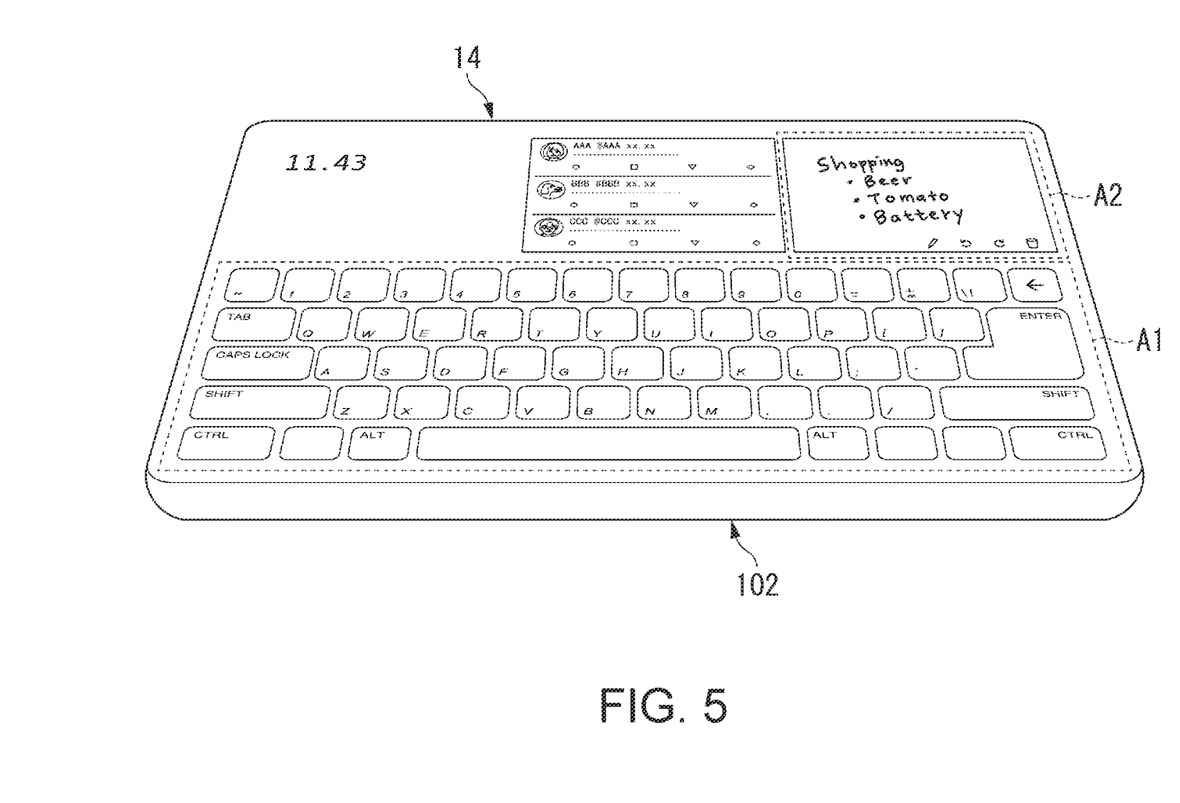
FIG. 5 is a diagram illustrating a modification example of the virtual input device of the laptop PC.

FIG. 5 is a diagram illustrating a modification example of the virtual input device of the laptop PC 1 according to the present embodiment.

FIG. 5 illustrates the display section 141 placed on the second chassis of the laptop PC 1. The display section 141 displays two virtual input devices, namely, an OSK (area A1) and a handwriting input device (area A2).

In the example illustrated in FIG. 5, the MCU 40 outputs input information of the two virtual input devices, namely, the OSK and the handwriting input device, to the main system 10, and also generates two pieces of image data for the OSK (area A1) and the handwriting input device (area A2) and outputs the generated image data to the main system 10.

Further, in the present embodiment described above, if the load of image data updating is large, or if a communication band available for image transfer by the USB is insufficient, or if it is desired to efficiently implement images, then the MCU 40 may divide image data into blocks and process each block as needed. This enables the laptop PC 1 to reduce the processing load and also makes it possible to decrease the communication band to be used.

Second Embodiment

A description will now be given of a laptop PC 1a according to a second embodiment with reference to the accompanying drawings.

In the second embodiment, a modification example provided with touch screens 14 in place of the display unit 15 displaying the main screen will be described.

Figure 6:
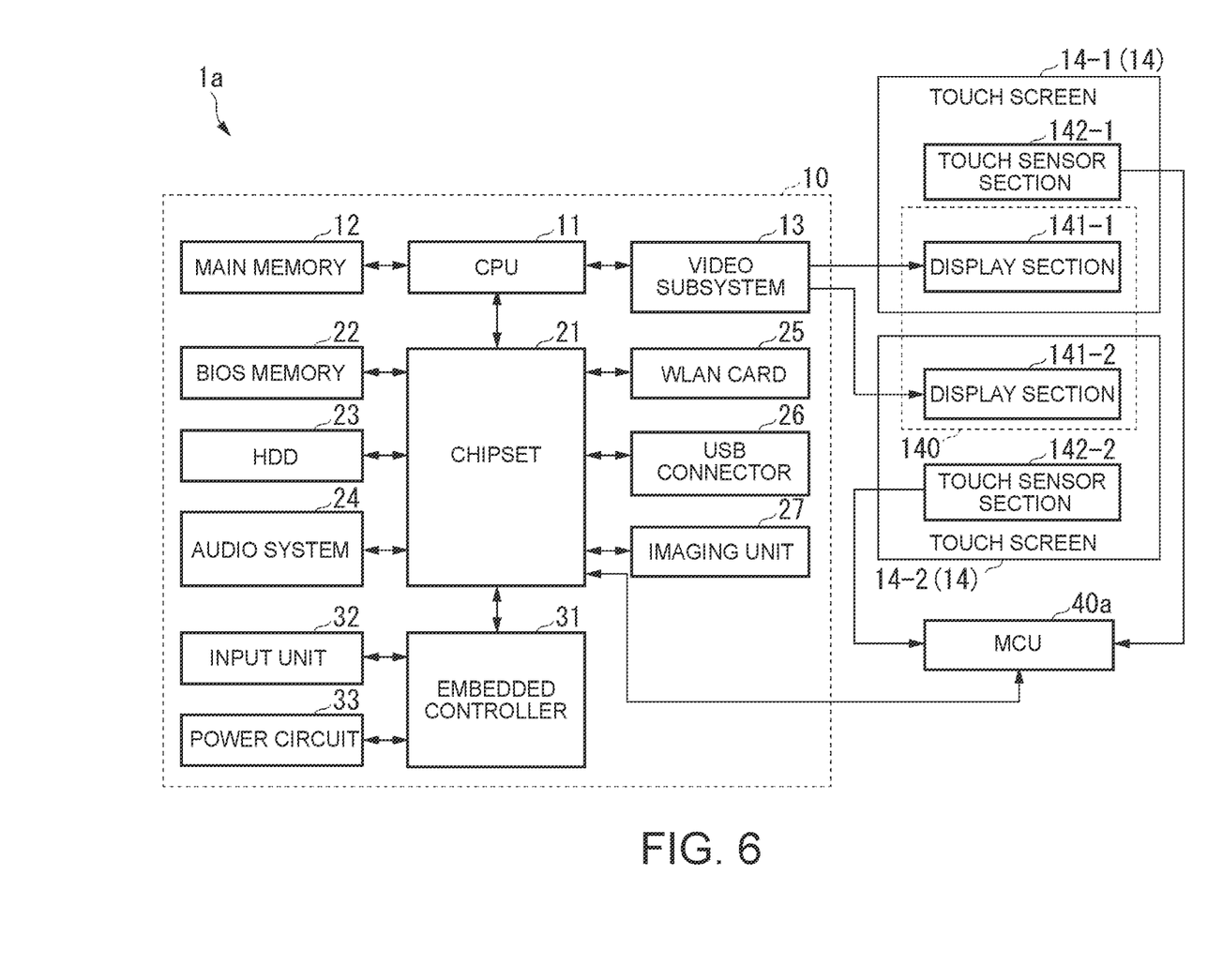
FIG. 6 is a diagram illustrating an example of a major hardware configuration of a laptop PC.

FIG. 6 is a diagram illustrating an example of the major hardware configuration of the laptop PC 1a according to the present embodiment.

As illustrated in FIG. 6, the laptop PC 1a includes a CPU 11, a main memory 12, a video subsystem 13, two touch screens 14, a chipset 21, a BIOS memory 22, a HDD 23, an audio system 24, a WLAN card 25, a USB connector 26, an imaging unit 27, an embedded controller 31, an input unit 32, a power circuit 33, and an MCU 40a.

In FIG. 6, the same parts as those in FIG. 2 described above will be assigned the same reference numerals and the descriptions thereof will be omitted.

In the present embodiment, the laptop PC 1a has two touch screens 14 (14-1 and 14-2). The touch screen 14-1 is placed on a first chassis 101 and functions as the main display unit. The touch screen 14-1 has a display section 141-1 and a touch sensor section 142-1.

The touch screen 14-2 is placed on a second chassis 102, and has a display section 141-2 and a touch sensor section 142-2.

The touch screen 14-1 and the touch screen 14-2 have the same configuration, and will be therefore referred to as the touch screen 14 when any touch screen provided on the laptop PC 1a is referred to, or when these touch screens are not particularly distinguished.

Further, the display section 141-1 and the display section 141-2 have the same configuration as the display section 141 described above, so that the descriptions thereof will be omitted. In addition, the touch sensor section 142-1 and the touch sensor section 142-2 have the same configuration as that of the touch sensor section 142 described above, so that the descriptions thereof will be omitted here.

Further, in the present embodiment, the display section 141-1 and the display section 141-2 can be handled as a single display section 140. In the display section 140, the display section 141-1 may be referred to as a first display area, and the display section 141-2 may be referred to as a second display area.

The basic function of the MCU 40a (an example of an embedded system) is the same as that of the MCU 40 of the first embodiment described above. The MCU 40a differs from the MCU 40 of the first embodiment in that the MCU 40a performs virtual input device control on the two touch screens 14.

Figure 7:
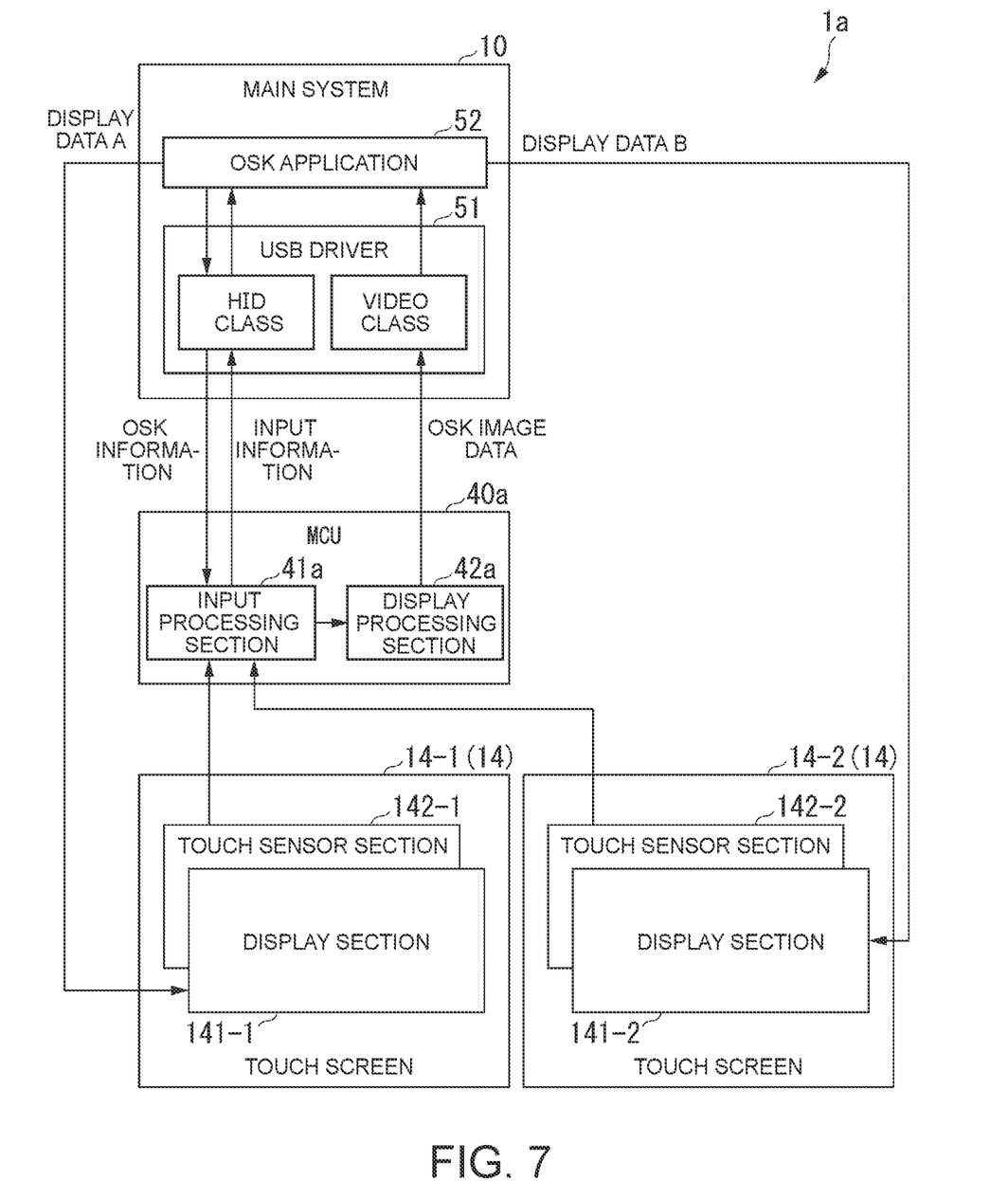
FIG. 7 is a block diagram illustrating an example of the functional configuration of the laptop PC.

Referring now to FIG. 7, the functional configuration of the laptop PC 1a according to the present embodiment will be described.

FIG. 7 is a block diagram illustrating an example of the functional configuration of the laptop PC 1a according to the present embodiment.

As illustrated in FIG. 7, the laptop PC 1a has a main system 10, the two touch screens 14 (14-1 and 14-2), and the MCU 40a. FIG. 7 illustrates only the major functional configuration of the present embodiment as the configuration of the laptop PC 1a. In FIG. 7, the same parts as those in FIG. 3 described above will be assigned the same reference numerals and the descriptions thereof will be omitted.

The MCU 40a has an input processing section 41a and a display processing section 42a.

The input processing section 41a has the same function as that of the input processing section 41 of the first embodiment described above, but differs in that the input processing section 41a handles the two touch sensor sections (142-1 and 142-2).

The input processing section 41a uses the HID class of a USB interface to receive type information and display position information from the main system 10, and sets the type of an input area of a virtual input device according to the type information, and also sets the input area of the virtual input device according to the display position information. Further, the input processing section 41a outputs the received type information and display position information to the display processing section 42a to generate OSK image data.

In addition, the input processing section 41a acquires detection information detected by the two touch sensor sections (142-1 and 142-2), and converts the detection information detected in the input area set as described above into input information such as a key code. The input processing section 41a outputs the converted input information to the main system 10 by using the HID class of the USB interface.

Further, when an input in the input area set as described above is detected, the input processing section 41 outputs the detection information of the two touch sensor sections (142-1 and 142-2) to the display processing section 42a to generate feedback OSK image data according to the detection information.

Based on the type information and the display position information, the display processing section 42a generates OSK image data for the display section 141-1 and the display section 141-2, and outputs the generated OSK image data to the main system 10 by using the VIDEO class (UVC) of the USB interface.

An OSK application 52 of the present embodiment receives the OSK image data, which is output from the MCU 40a, by using the VIDEO class of a USB driver 51. If the OSK image data indicates the virtual input device of the display section 141-1, then the OSK application 52 outputs display data A for displaying the OSK image data at the display position of the input area of the display section 141-1 so as to cause the display section 141-1 to display the OSK image data. Further, if the OSK image data indicates the virtual input device of the display section 141-2, then the OSK application 52 outputs display data B for displaying the OSK image data at the display position of the input area of the display section 141-2 so as to cause the display section 141-2 to display the OSK image data.

As described above, the laptop PC 1a according to the present embodiment includes the main system 10, the two touch screens 14 (14-1 and 14-2), and the MCU 40a. The MCU 40a controls the virtual input devices corresponding to the two touch screens 14 (14-1 and 14-2).

Consequently, the laptop PC 1a according to the present embodiment enables a virtual input device to be used also for 14-1, which displays the main screen, thus making it possible to achieve a virtual input device that provides an even higher degree of freedom while protecting privacy at the same time.

Further, in the present embodiment, the display section 140 may include a display section 141-1 (a first display area) that displays the image data of the main screen of the main system 10 and a display section 141-2 (a second display area) that displays image data including the image data of an input area.

Consequently, the laptop PC 1a according to the present embodiment can flexibly display various image data by using the two display areas (the display section 141-1 and the display section 141-2).

The present disclosure is not limited by the embodiments described above, and can be modified within a scope that does not deviate from the spirit of the present disclosure.

For example, in the above-described embodiments, the description has been given of the examples in which the information processing apparatus is the laptop PC 1 (1a); however, the present disclosure is not limited thereto, and the information processing apparatus may alternatively be other information apparatus such as a tablet terminal device or a desktop PC.

Further, in the above-described second embodiment, the description has been given of the example in which the display section 140 is used by being divided into the two display areas (the display section 141-1 and the display section 141-2), or the example in which the laptop PC 1a has the two display sections 141 (141-1 and 141-2); however, the present disclosure is not limited thereto. For example, the display section 140 may be used by being divided into three display areas, or the laptop PC 1a may include three or more display sections 141.

Further, in the above-described embodiments, the description has been given of the example, in which the input device that implements the OSK, as an example of the virtual input device; however, the present disclosure is not limited thereto. The virtual input device may alternatively be, for example, a handwriting input device, a software keyboard, a pointing device, or the like.

Further, in the above-described embodiments, the examples in which the HID class of the USB interface and the UVC are used have been described as the examples of the general-purpose interfaces protected by the main system 10 (OS); however, the present disclosure is not limited thereto, and any other general-purpose interfaces may be used insofar as the interfaces are protected by the main system 10 (OS).

Further, in the above-described embodiments, the examples in which the MCU 40 (40a) generates the feedback OSK image data have been described. Alternatively, however, the MCU 40 (40a) may generate sound data, such as clicking sounds, together with the OSK image data.

Each constituent included in the above-described laptop PC 1 (1a) has a computer system therein. Further, the processing in each constituent included in the above-described laptop PC 1 (1a) may be carried out by recording a program for implementing the function of each constituent included in the above-described laptop PC 1 (1a) on a computer-readable recording medium, and by reading the program recorded on the recording medium into the computer system to execute the program. Here, "reading a program recorded on a recording medium into a computer system to execute the program" includes installing a program in a computer system. The term "computer system" as used herein includes an OS and hardware such as peripheral devices.

Further, "the computer system" may include a plurality of computer devices connected via networks including the Internet, a WAN, a LAN, and communication lines such as a dedicated line. Further, "the computer-readable recording medium" refers to a portable medium such as a flexible disk, a magneto-optical disk, a ROM or a CD-ROM, or a storage device such as a hard disk incorporated in a computer system. Thus, a recording medium storing a program may be a non-transient recording medium such as a CD-ROM.

Further, the recording medium also includes an internally or externally provided recording medium that can be accessed from a distribution server to distribute the program. The program may be divided into a plurality of segments, which are downloaded at different timings and then combined in each constituent included in the laptop PC 1 (1a), or the distribution server for distributing each segment of the divided program may be different. Furthermore, "the computer-readable recording medium" also includes one that retains a program for a predetermined time such as a volatile memory (RAM) inside a computer system that acts as a server or a client when a program is sent via a network. Further, the above-described program may be for implementing a part of the above-described functions. In addition, the above-described program may be a so-called difference file (difference program), which can implement the above-described functions in combination with a program already recorded in the computer system.

Further, some or all of the above-described functions may be implemented as an integrated circuit, such as an LSI (Large Scale Integration). The above-described functions may be individually made into a processor, or may be partially or fully integrated into a processor. In addition, the integrated circuit method is not limited to an LSI, but can also be implemented by a dedicated circuit or a general-purpose processor. Further, when an integrated circuit technology that replaces an LSI appears due to advances in semiconductor technology, an integrated circuit based on this technology may be used.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. An information processing apparatus comprising:
a display unit;
a touch sensor that is disposed on the display unit and that detects contact with an object on the display unit;
a main system that:
comprises:
a main processor; and
a main memory, and
executes an Operating System (OS); and
an embedded system that is separate from the main system, comprising:
an embedded processor, and
an embedded memory, wherein
the embedded system:
generates image data of an input area for a virtual input device, wherein
the image data includes an image of at least a portion of the virtual input device, outputs, to the main system, the image data of the input area,
wherein
the embedded system outputs the image data using a first general-purpose interface protected by the main system, and
outputs, to the main system, input information based on detection information detected in the input area by the touch sensor, via the virtual input device, wherein the embedded system outputs the input information using a second general-purpose interface protected by the main system, and the main system displays, on the display unit, the image data of the input area output by the embedded system.

2. The information processing apparatus according to claim 1, wherein the embedded system:

outputs the input information accepted by the virtual input device to the main system by using a Human Interface Device (HID) class of a Universal Serial Bus (USB) interface, and outputs the image data of the input area to the main system by using a USB Video Class (UVC).

3. The information processing apparatus according to claim 1, wherein the main system:

sends display position information indicating a display position of the input area in the display unit to the embedded system, and displays image data of the input area output by the embedded system at a display position of the input area in the display unit, and the embedded system sets the input area on the basis of the display position information sent from the main system.

4. The information processing apparatus according to claim 1, wherein the main system sends type information indicating a type of the virtual input device to the embedded system, and the embedded system sets a type of the input area on the basis of the type information sent from the main system.

5. The information processing apparatus according to claim 1, wherein the embedded system changes the image data of the input area according to feedback based on input information accepted by the virtual input device.

6. The information processing apparatus according to claim 1, wherein the display unit comprises a first display area displaying a main screen of the main system and a second display area displaying the image data of the input area.

7. A control method for controlling an information processing apparatus including: a display unit, a touch sensor that is disposed on the display unit and that detects contact with an object on the display unit, a main system that: includes a main processor and a main memory, and executes an Operating System (OS), and an embedded system separate from the main system, including an embedded processor and an embedded memory, the method comprising:

generating, by the embedded system, image data of an input area for a virtual input device, wherein the image data includes an image of at least a portion of the virtual input device;

outputting, by the embedded system, the image data of the input area, wherein the image data is output to the main system using a first general-purpose interface protected by the main system;

outputting, by the embedded system, input information based on detection information detected in the input area by the touch sensor, via the virtual input device, wherein the input information is output to the main system using a second general-purpose interface protected by the main system; and displaying, by the main system on the display unit, the image data of the input area output by the embedded system.

* * * * *